US008667308B2

(12) United States Patent
de Cesare et al.

(10) Patent No.: US 8,667,308 B2
(45) Date of Patent: Mar. 4, 2014

(54) DYNAMIC VOLTAGE DITHERING

(75) Inventors: Joshua de Cesare, Campbell, CA (US); Jonathan Jay Andrews, San Jose, CA (US)

(73) Assignee: Apple Inc., Cupertino, CA (US)

( * ) Notice: Subject to any disclaimer, the term of this patent is extended or adjusted under 35 U.S.C. 154(b) by 588 days.

(21) Appl. No.: 12/833,765

(22) Filed: Jul. 9, 2010

(65) Prior Publication Data
US 2011/0314305 A1 Dec. 22, 2011

Related U.S. Application Data

(60) Provisional application No. 61/356,438, filed on Jun. 18, 2010.

(51) Int. Cl.
*G06F 1/00* (2006.01)

(52) U.S. Cl.
USPC .......................................................... 713/300

(58) Field of Classification Search
USPC ........................... 700/300, 320, 340; 713/300
See application file for complete search history.

(56) References Cited

U.S. PATENT DOCUMENTS

| | | | |
|---|---|---|---|
| 5,825,674 A | 10/1998 | Jackson | |
| 6,105,142 A | 8/2000 | Goff et al. | |
| 6,938,176 B1 | 8/2005 | Alben et al. | |
| 7,032,117 B2 | 4/2006 | Kolinummi et al. | |
| 7,240,223 B2 | 7/2007 | De Cesare et al. | |
| 7,289,921 B1 | 10/2007 | Salmi et al. | |
| 7,372,382 B2 | 5/2008 | Hazucha et al. | |
| 7,451,332 B2 | 11/2008 | Culbert et al. | |
| 7,483,803 B2 | 1/2009 | Dorsey et al. | |
| 7,529,948 B2 | 5/2009 | Conroy et al. | |
| 7,562,234 B2 | 7/2009 | Conroy | |
| 7,609,047 B2 | 10/2009 | Ravichandran | |
| 7,949,889 B2 | 5/2011 | Sotomayor, Jr. et al. | |
| 8,330,476 B2 | 12/2012 | Chan et al. | |
| 2003/0071657 A1 | 4/2003 | Soerensen et al. | |

(Continued)

FOREIGN PATENT DOCUMENTS

| | | |
|---|---|---|
| EP | 0 539884 A1 | 5/1993 |
| EP | 0 632 360 A1 | 1/1995 |

OTHER PUBLICATIONS

PCT International Search Report and Written Opinion of the International Searching Authority mailed Oct. 17, 2011 for PCT/US2011/039510 filed Jun. 7, 2011.

(Continued)

*Primary Examiner* — Kim Huynh
*Assistant Examiner* — Alyaa T Mazyad
(74) *Attorney, Agent, or Firm* — Meyertons, Hood, Kivlin, Kowert & Goetzel, P.C.

(57) ABSTRACT

A request for a high voltage mode is received and a high voltage timer is started in response to determining that a remaining amount of high voltage credits exceeds a voltage switch threshold value. A switch to the high voltage mode is made in response to the request. A low voltage mode is switched to in response to an indication. The request may be received from an application running on a data processing system. If the indication is that the high voltage timer has expired, a low voltage timer is started in response to switching to low voltage mode. If the high voltage request is still active when the low voltage timer expires, a switch back to high voltage mode occurs and a new high voltage timer is started.

21 Claims, 8 Drawing Sheets

(56) References Cited

U.S. PATENT DOCUMENTS

| | | |
|---|---|---|
| 2006/0288241 A1 | 12/2006 | Felter et al. |
| 2007/0049133 A1 | 3/2007 | Conroy |
| 2007/0049134 A1 | 3/2007 | Conroy |
| 2007/0050650 A1 | 3/2007 | Conroy |
| 2007/0067136 A1 | 3/2007 | Conroy et al. |
| 2008/0077817 A1 | 3/2008 | Brundridge et al. |
| 2008/0148273 A1 | 6/2008 | Huang et al. |
| 2008/0263373 A1 | 10/2008 | Meier et al. |
| 2009/0177422 A1 | 7/2009 | Cox |
| 2009/0177907 A1* | 7/2009 | Sotomayor et al. ............ 713/340 |
| 2009/0276651 A1 | 11/2009 | Conroy et al. |
| 2010/0229012 A1* | 9/2010 | Gaskins et al. ................ 713/322 |
| 2012/0054511 A1* | 3/2012 | Brinks et al. ................... 713/310 |

OTHER PUBLICATIONS

Benton H. Calhoun, Anantha P. Chandrakasan, "Ultra-Dynamic Voltage Scaling (UDVS) Using Sub-Threshold Operation and Local Voltage Dithering", IEEE Journal of Solid-State Circuits, vol. 41, No. 1, Jan. 1, 2006, 8 pages.

* cited by examiner

DYNAMIC VOLTAGE DITHERING

RELATED APPLICATIONS

This application claims priority to U.S. Provisional Application No. 61/356,438 filed on Jun. 18, 2010.

FIELD OF THE INVENTION

Embodiments of the invention are generally directed toward thermal management, and in particular, dynamic voltage dithering.

BACKGROUND

Voltage dithering is a well-known technique for managing heat generation in a computing system. A dithering requirement is imposed on requests for high voltage in a computer system using a free running clock, which divides a given cycle into high-voltage-possible and only-low-voltage phases. If a process running on the system requests high voltage during a high-voltage-possible phase, it receives high voltage so long as the high-voltage-possible phase lasts, whereas if the process requests high voltage during a only-low-voltage phase, no high voltage is given. This decreases performance of the system, since the high voltage phases are enforced independently of high voltage requests from processes on the system.

FIG. 1 illustrates waveforms of a prior art voltage dithering process. Waveform 101 is the voltage dithering waveform, and evenly distributes high and low voltage phases over a period of time using a free-running clock. Half of the time of the cycle is made available for high voltage, and half of the time is required to be low voltage. Waveform 105 illustrates when a process running a computer system has requested high voltage and when that request was satisfied. The unfilled portion of the high voltage requests in waveform indicate that the request for high voltage was satisfied, whereas the shaded portions 105, 106, 107, and 111 of the high voltage requests indicate that portions of the request for high voltage were not satisfied due to requirements of the dithering waveform 101. Waveform 113 illustrates the portions of the high voltage requests that were satisfied. Although the dithering waveform 101 allowed up to 50% of the cycle to be high voltage and the high voltage requests amounted to only 45%, due to the independence of the dithering waveform 101 from the voltage request waveform 103, only 18% of the cycle was spent in a high voltage mode, unnecessarily reducing the performance of the system.

SUMMARY

A request for a high voltage mode is received and a high voltage timer is started in response to determining that a remaining amount of high voltage credits exceeds a voltage switch threshold value. A switch to the high voltage mode is made in response to the request. A low voltage mode is switched to in response to an indication. The request may be received from an application running on a data processing system. If the indication is that the high voltage timer has expired, a low voltage timer is started in response to switching to low voltage mode. If the high voltage request is still active when the low voltage timer expires, a switch back to high voltage mode occurs and a new high voltage timer is started.

DESCRIPTION OF THE DRAWINGS

The present invention is illustrated by way of example and not limitation in the figures of the accompanying drawings in which like references indicate similar elements.

DETAILED DESCRIPTION

Figure 1:
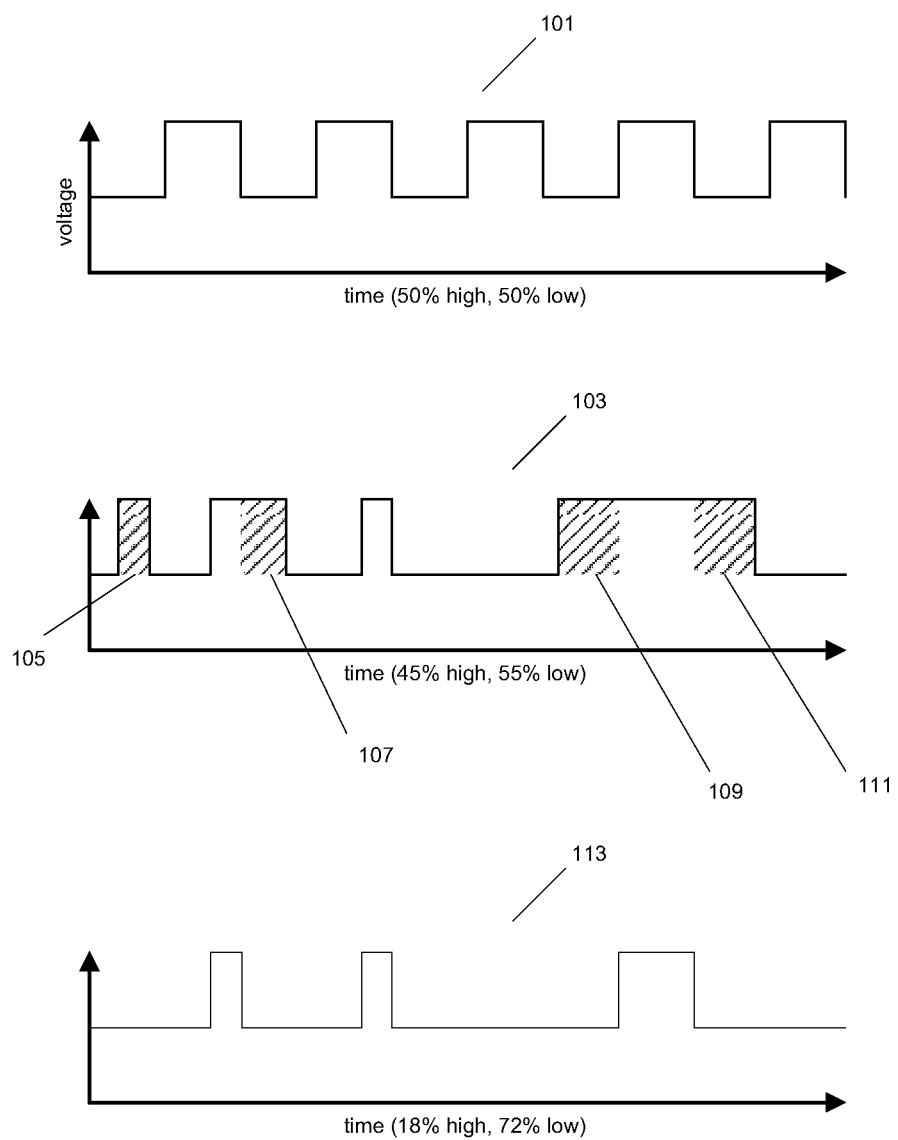
FIG. 1 is a diagram illustrating prior art voltage dithering.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Embodiments of dynamic voltage dithering are described herein. In one embodiment, dynamic voltage dithering dynamically defines the voltage dithering waveform based on requests for high voltage from applications or processes running on a data processing system. The amount of dithering during a cycle may be specified using two values: a period, which measures the duration of the cycle, and a factor, which specifies the percentage of the cycle that can be spent in a high voltage state. For example, the period may be 8 milliseconds, and the factor may be 50%. With a clock cycle of 24 mhz, 8 milliseconds includes about 3,000 clock ticks. Each clock tick may be considered a credit, and with a factor of 50%, 1,500 credits represents the high voltage time budget. When a process running on the data processing system requests high voltage, an embodiment of the invention determines whether high voltage credits are available in the high voltage budget, and if so, switches to a high voltage state until the high voltage credits expire or the request is canceled. If the duration of the high voltage requests does not exceed the high voltage time budget for that cycle, then the dithering may not have any impact on performance.

Voltage requests may take the form of a request directly from an application for additional voltage (or to cancel an existing request for additional voltage) based on the processing needs of the requesting application. Voltage requests may also be generated by a power management unit (or other system) based on static stables, or through dynamic means such as a dynamic performance state manager (DPSM).

Some embodiments of dynamic voltage dithering may use timers. For example, a timer may be used to determine when high voltage credits have expired, or when low voltage credits have expired. In one embodiment, a data processing system using dynamic voltage dithering may have a single physical timer which provides timing services throughout the system using a variety of schedulers for requested time outs (that is, timer expiration). Other systems may use other timers. In some embodiments, the timers may be hardware timers, software timers, or a combination of hardware and software timers. One embodiment may use a single hardware timer or a single software timer and implement multiple timers by scheduling the multiple timers relative to the single timers. Other embodiments may use multiple hardware timers and/or multiple software timers.

FIG. 2 is a diagram illustrating dynamic voltage dithering according to an embodiment of the invention. Waveform 201 is the waveform of the voltage dithering and indicates when the voltage is high and when the voltage is low. Waveform 203 is the waveform of the voltage requests from a data processing system. The high voltage budget for waveform 201 is 50%. That is, for the cycle illustrated by the waveform 201, no more than 50% of the cycle can be spent in a high voltage mode. Waveform 203 indicates that the voltage-requesting application or process requested that 45% of the time during the current cycle be in a high voltage mode. As described below, since the requested time for high voltage is less than or equal to the budgeted time for high voltage, no performance penalty was incurred by the requesting data processing system due to the dynamic voltage dithering.

At time 221, the data processing system requests high voltage from the voltage management system. In response, the voltage management system increases the voltage at time 205, which may be substantially the same as time 221. The decision by the voltage management system to increase the voltage is described in greater detail below in conjunction with FIGS. 3 and 4. Generally, the voltage management system determines whether, for the current cycle, there is enough time left in the high voltage budget to switch to a high voltage mode. At time 205, the high voltage budget is at 50%, so the request to increase voltage is granted. At time 207, the voltage management system receives an indication that the high voltage request received at time 205 has been canceled. In response, the voltage management system switches back to low voltage mode and updates the high voltage budget to reflect the time spent in the high voltage mode. Cancellation of high voltage requests is described in greater detail below in conjunction with FIGS. 4 and 5.

During the period from time 207 to time 209, the voltage management system keeps track of the time spent in a low voltage mode. This is charged against a low voltage "budget" which corresponds to the amount of time in the cycle less the amount of time budgeted for a high voltage mode. If all of the high voltage budget is expended during a cycle, the next cycle may not start until the remainder of the low voltage budget has been consumed.

At time 223, the data processing system (i.e., an application running on the data processing system) requests another high voltage mode. In response, the voltage management system switches back into a high voltage mode at time 209. At time 211, the voltage management system receives an indication that the high voltage request has been cancelled and switches back to a low voltage mode. The time spent in the high voltage mode is subtracted from the high voltage budget. Similarly, requests at times 225 and 227 result in high voltage modes from 213 through 215 and 217 through 219. Since the duration of requested high voltage modes is less than or equal to the high voltage budget for the cycle, the dithering limits the performance penalty by satisfying most or all of the high voltage requests.

Figure 2A:
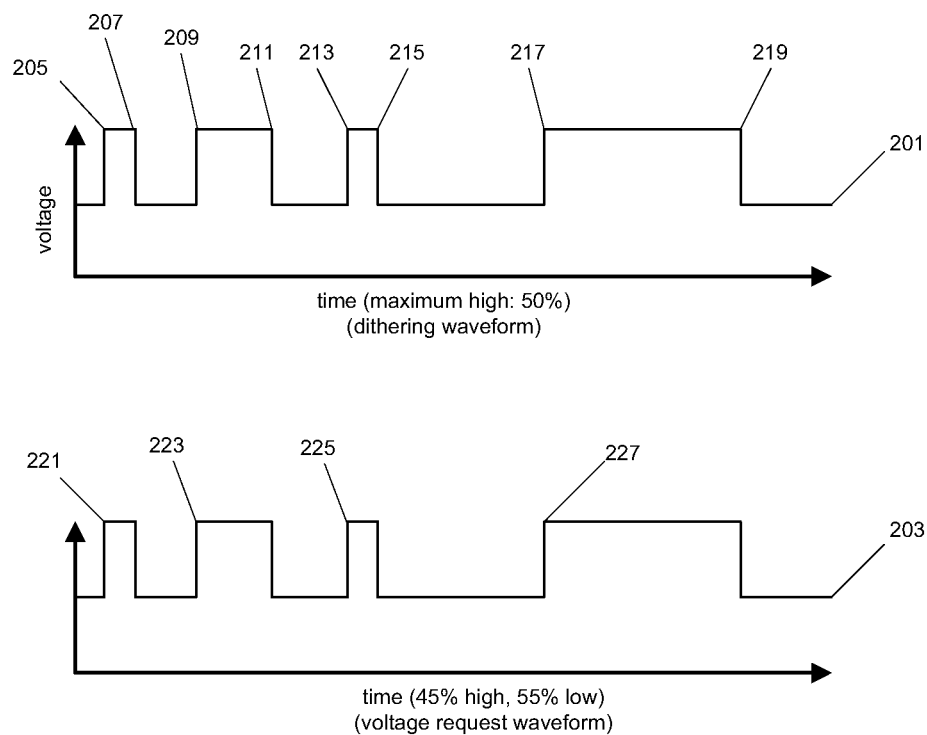
FIG. 2A is a diagram illustrating dynamic voltage dithering according to an embodiment of the invention.
Figure 2B:
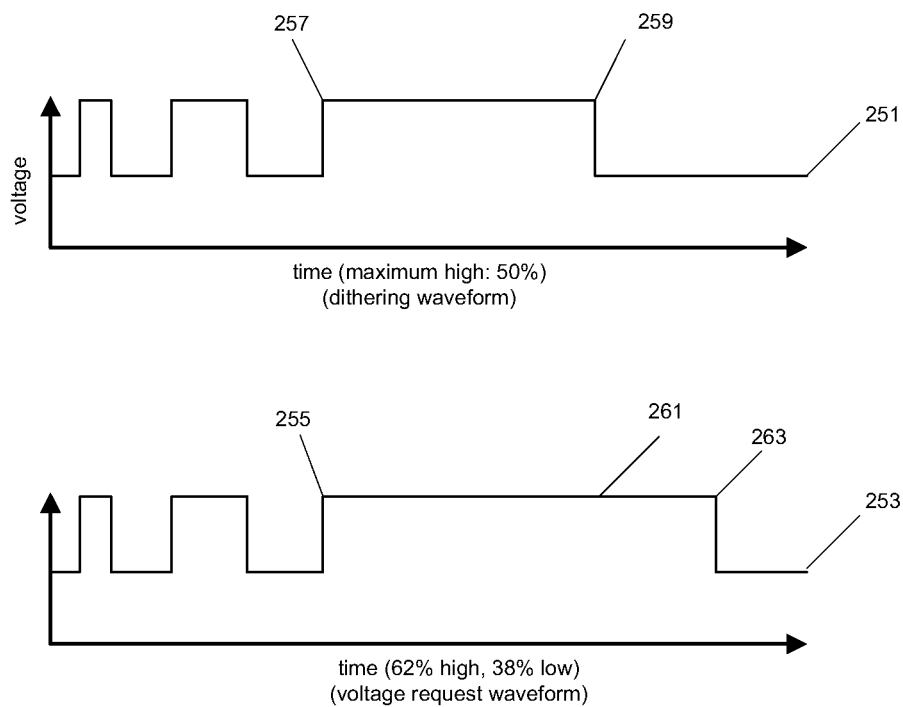
FIG. 2B is a diagram illustrating dynamic voltage dithering according to another embodiment of the invention.

Turning now to FIG. 2B, which illustrates dynamic voltage dithering in the situation where the duration of high voltage requests exceeds the high voltage time budget for the cycle. Waveform 251 illustrates the voltage dithering waveform and waveform 253 illustrates the voltage request waveform. The first two voltage requests are satisfied within the high voltage budget. At time 255, a third high voltage request is received by the voltage management system. At time 257, the high voltage request is granted and the data processing system enters a high voltage mode. At time 259, the high voltage budget for the current cycle has been expended, although as indicated at time 261, the high voltage request remains in effect. The voltage management system, in response to determining that the high voltage budget has been exceeded, switches the data processing system to a low voltage mode at time 259. At time 263, the high voltage request ends.

Figure 3:
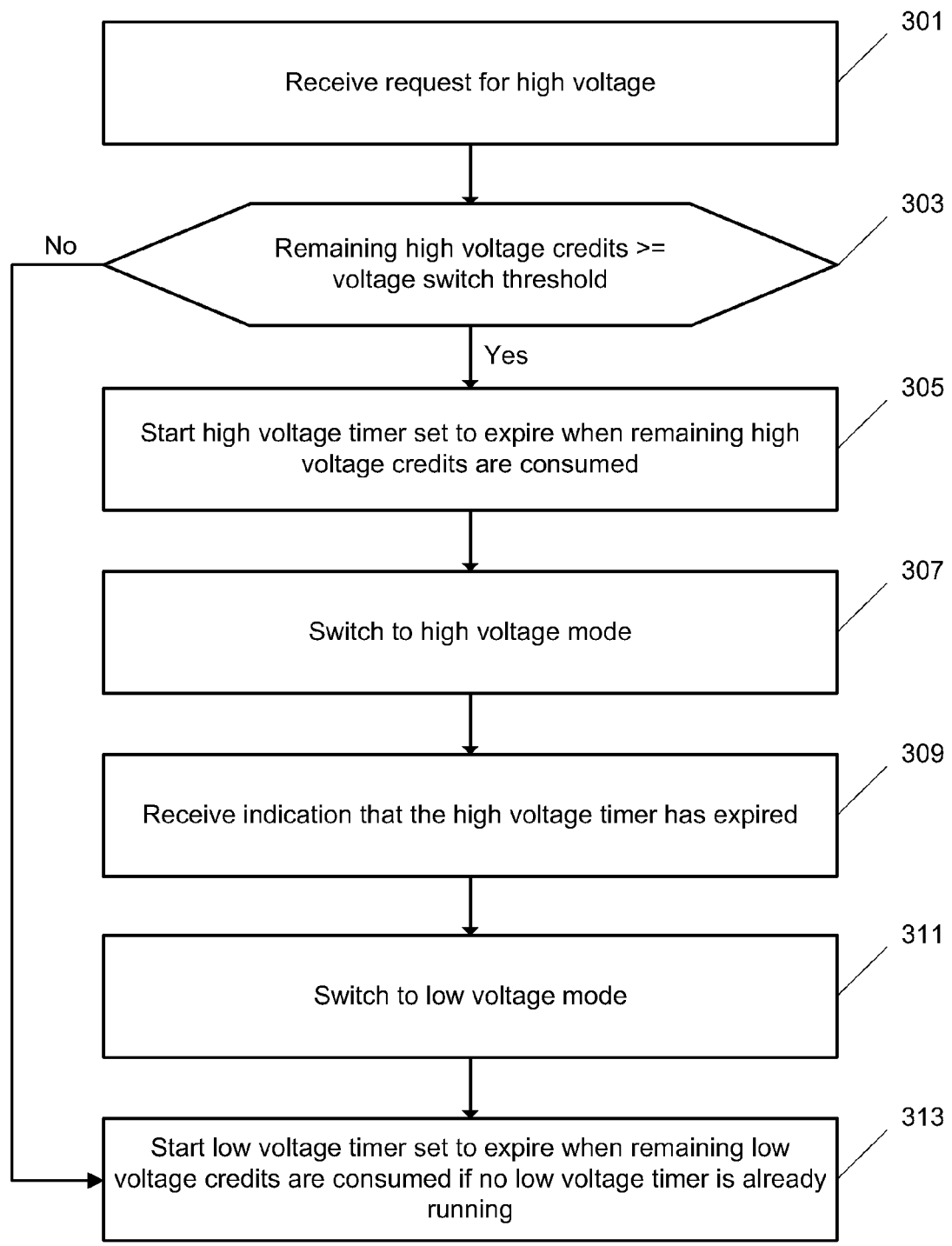
FIG. 3 is a flowchart illustrating a method of dynamic voltage dithering according to an embodiment of the invention.

Turning now to FIG. 3, which illustrates a method of managing a request for high voltage using dynamic voltage dithering according to an embodiment of the invention. At block 301, the method receives a request for high voltage. The request may be received from an application running on a data processing system. In one embodiment, the entire system may be placed in a high voltage mode or a low voltage mode, regardless of which component in the system the requesting application will use during the high voltage mode. In another embodiment, there may be multiple voltage domains (or voltage islands) in the data processing system. For example, it may be possible to individually request high voltage for the central processing unit (CPU), the graphics processing unit (GPU), and/or for other portions of the system. The increased granularity of voltage control may further improve the performance of the dynamic voltage dithering.

At block 303, the method determines whether the remaining high voltage budget is greater than or equal to a voltage switch threshold. The voltage switch threshold may be zero, in which case the switch is always performed if there are any high voltage credits remaining. In another embodiment, the voltage switch threshold may be a percentage of the cycle, such as millisecond. This threshold may be determined through empirical study based on the amount of overhead associated with performing the voltage switch and whether it is worthwhile to perform the switch. The value may change depending on the particular hardware and software of an embodiment.

If the remaining high voltage credits exceeds the voltage switch threshold, then the method proceeds to block 305 and starts a high voltage timer set to expire when remaining high voltage credits are consumed. At block 307, the method switches the data processing system (or a subset of the data processing system, as described above) to a high voltage mode. At block 309, the method receives an indication that the high voltage timer has expired. In one embodiment, the expired timer generates a callback into the voltage management system which indicates to the voltage management system that the high voltage credits for the current cycle have been consumed and that a switch to a low voltage mode may be required. One example of the expiration of a high voltage timer and a subsequent switch to a low voltage mode may be seen at time 259 in FIG. 2B.

At block 311, the method switches to a low voltage mode and at block 313 starts a low voltage timer set to expire when remaining low voltage credits are consumed, if no low voltage timer is already running. Also, if at block 303 the method determines that the remaining high voltage credits do not exceed the voltage switch threshold, the method starts a low voltage timer at block 313. Since the high voltage credits have been consumed at block 313, the data processing system (or portion thereof) may remain in a low voltage mode until the low voltage credits have been consumed (i.e., until the low voltage timer expires). Expiration of a low voltage timer is described in greater detail below in conjunction with FIG. 5.

Figure 4:
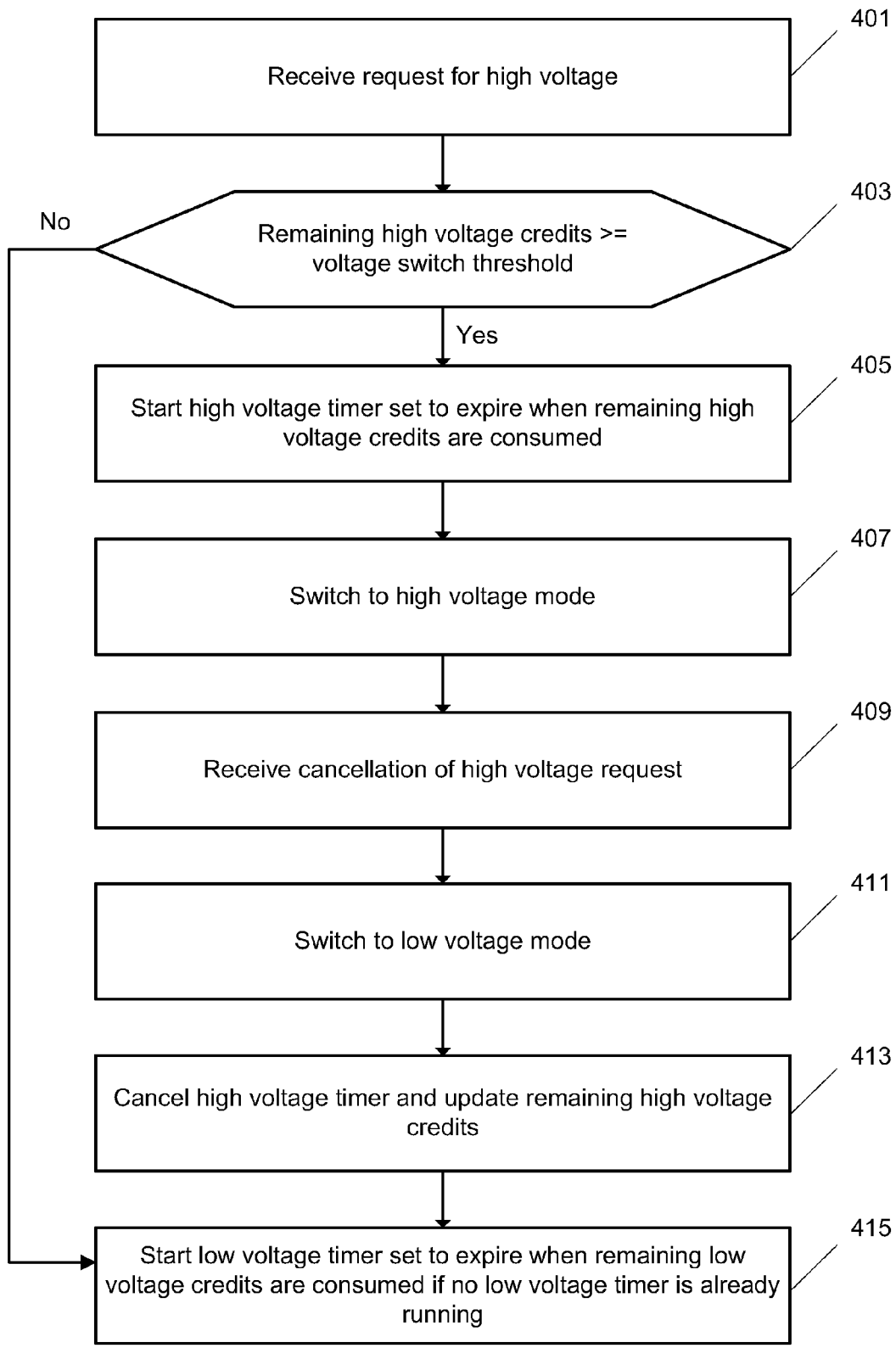
FIG. 4 is a flowchart illustrating another method of dynamic voltage dithering according to an embodiment of the invention.

Turning now to FIG. 4, which is a flow chart illustrating a method of managing a request for high voltage which is cancelled before the high voltage credits are consumed. At block 401, the method receives the request for high voltage. At block 403, the method determines if the remaining high voltage credits exceed the voltage switch threshold, and if so, starts a high voltage timer set to expire when remaining high voltage credits are consumed at block 405. The method switch to the high voltage mode at block 407, which may be a high voltage mode for the entire system, or just a portion of the system as described above. At block 409, the method receives an indication that the high voltage request has been cancelled. Cancellation of a high voltage request is illustrated in FIG. 2A at times 207, 211, 215, and 219. In each case, high voltage credits remain, but the application requesting the high voltage mode has cancelled the request.

At block 411, the method, in response to cancellation of the high voltage request, switches to a low voltage mode. At block 413, the method cancels the high voltage timer and updates remaining high voltage credits by subtracting the number of credits used during the high voltage request from the existing total.

At block 415, the method, if necessary, starts a low voltage timer set to expire when remaining low voltage credits are consumed. Also, if the method at 403 determines that the remaining high voltage credits do not exceed the voltage switch threshold, it proceeds to block 415 and starts a low voltage timer.

Figure 5:
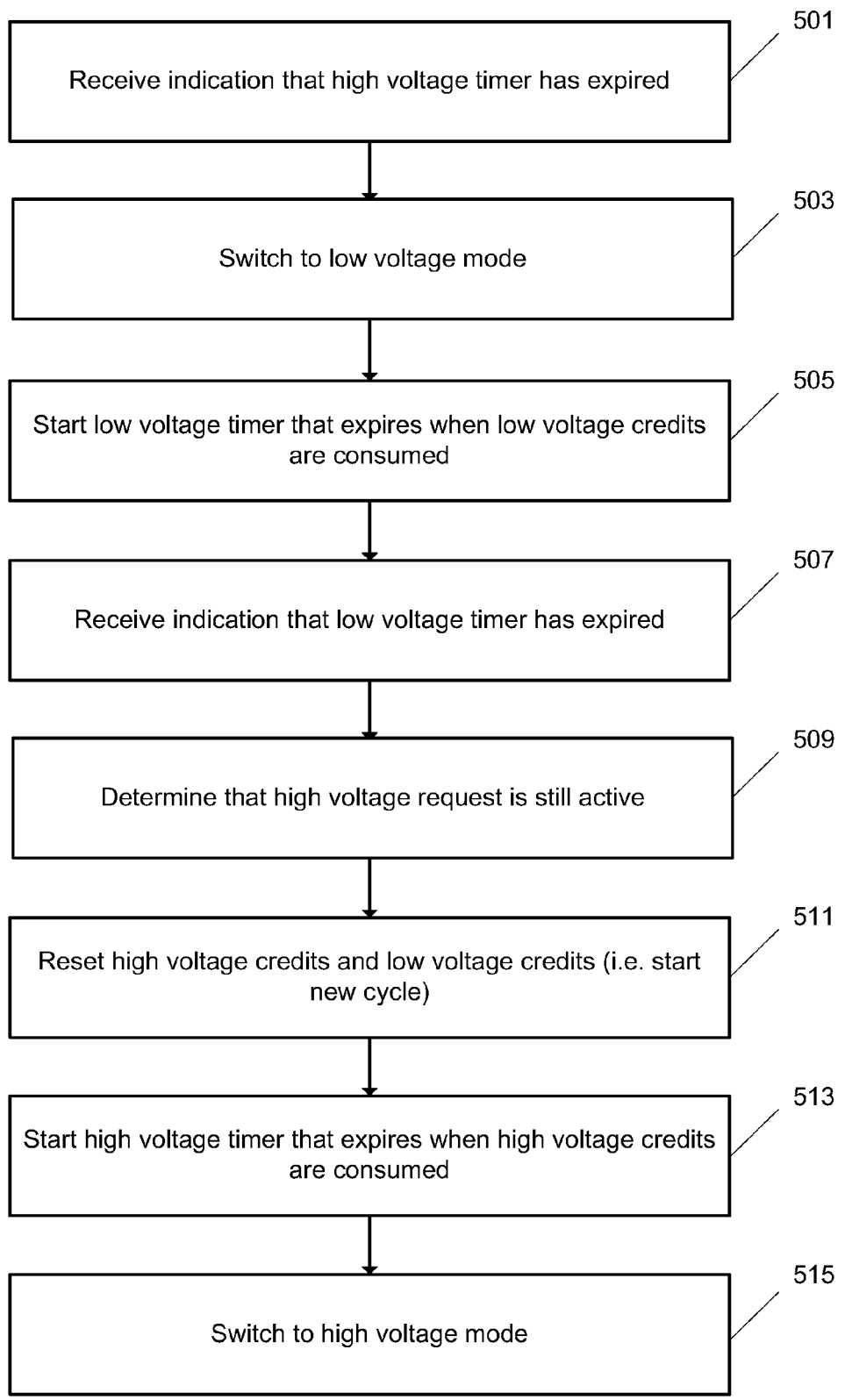
FIG. 5 is a flowchart illustrating still another method of dynamic voltage dithering according to an embodiment of the invention.

Turning now to FIG. 5, which is a flowchart illustrating a method of managing a high voltage request that is still active after a cycle ends. At block 501, the method receives an indication that a high voltage timer has expired while the data processing system (or a portion thereof) remains in a high voltage mode. This is illustrated graphically at time 259 in FIG. 2B.

At block 503, the method switches to a low voltage mode, since the expiring high voltage timer indicates that the current cycle has expended its high voltage credits. At block 506, the method starts a low voltage timer that expires when the remaining low voltage credits are consumed. At block 507, the method receives an indication that the low voltage timer has expired (e.g., a callback is made by the expired timer to the voltage management system). At block 509, the method determines that a high voltage request is active. This may be the same high voltage request that was active at block 501, or it may be a different high voltage request. At block 511, the method resets the high voltage credits and the low voltage credits, which may start a new cycle. At block 513, the method starts a high voltage timer that expires when the newly reset high voltage credits are consumed, and at block 515, switches to a high voltage mode.

In one embodiment, the limits on credit banking may be varied in real time by system components, such as a thermal management system, power management system, etc. For example, if the temperature of a critical component in the system is low, one or more of the thresholds limiting credit banking may be increased. As another example, if the temperature of the critical component rises, one or more of the thresholds limiting credit banking may be decreased. The banking thresholds may be modified based on the current temperature of components, or on a temperature trend (i.e., rapidly increasing, slowly decreasing, etc.)

In one embodiment, the parameters of the voltage management system may be varied in real time. For example, a thermal management system may determine that the data processing system is generating too much heat, and may lower the high voltage budget accordingly (e.g., by varying the factor that measures the percentage of each cycle that may be spent in a high voltage mode). In one embodiment, the current cycle is interrupted and a new cycle is started in response to the change. In another embodiment, the current cycle is allowed to complete with the previous settings, and the next cycle is started with the new settings.

In one embodiment, a cycle may end with high voltage credits remaining, since a cycle ends when its low voltage credits are consumed. These remaining high voltage credits may be "banked" against their use in a subsequent cycle. Depending on the needs of the data processing system (thermal management, power management, etc.) the amount of high voltage credits that may be banked can be limited. For example, only a per-cycle banking amount of credits may be banked against the follow cycle (e.g., up to 1 millisecond of high voltage worth of high voltage credits). As another example, the total amount of banked credits may be limited to a total banked amount. One or both of these limitations may be applied to banked high voltage credits, and some embodiments may not perform banking at all.

As described above, some embodiments of the invention may not switch to a high voltage mode in response to a request if the remaining high voltage credits do not exceed a voltage switch threshold. This threshold may be varied between cycles or during a cycle and may enhance efficiency of the dynamic voltage dithering by preventing the voltage management system from granting a request for high voltage that would take longer in overhead to accomplish that would provide in value of being in high voltage. A similar threshold may be used if a high voltage mode ends and the remaining low voltage credits is beneath the low voltage switch threshold. In this case, the next cycle may start immediately rather than spend the additional time in the low voltage mode.

As described above, a data processing system may be capable of separately dithering the voltage of different portions of a data processing system, such as the CPU, the GPU, and other components. This may improve efficiency, especially if combined with an empirical analysis of component use in the system. For example, it may be generally the case that a high voltage request for the CPU is followed by a high voltage request for the GPU to handle processing originating from the earlier high voltage mode of the CPU. In some embodiments, an application running on the data processing system may request multiple high voltage modes in serial, such as the CPU followed by the GPU.

Figure 6:
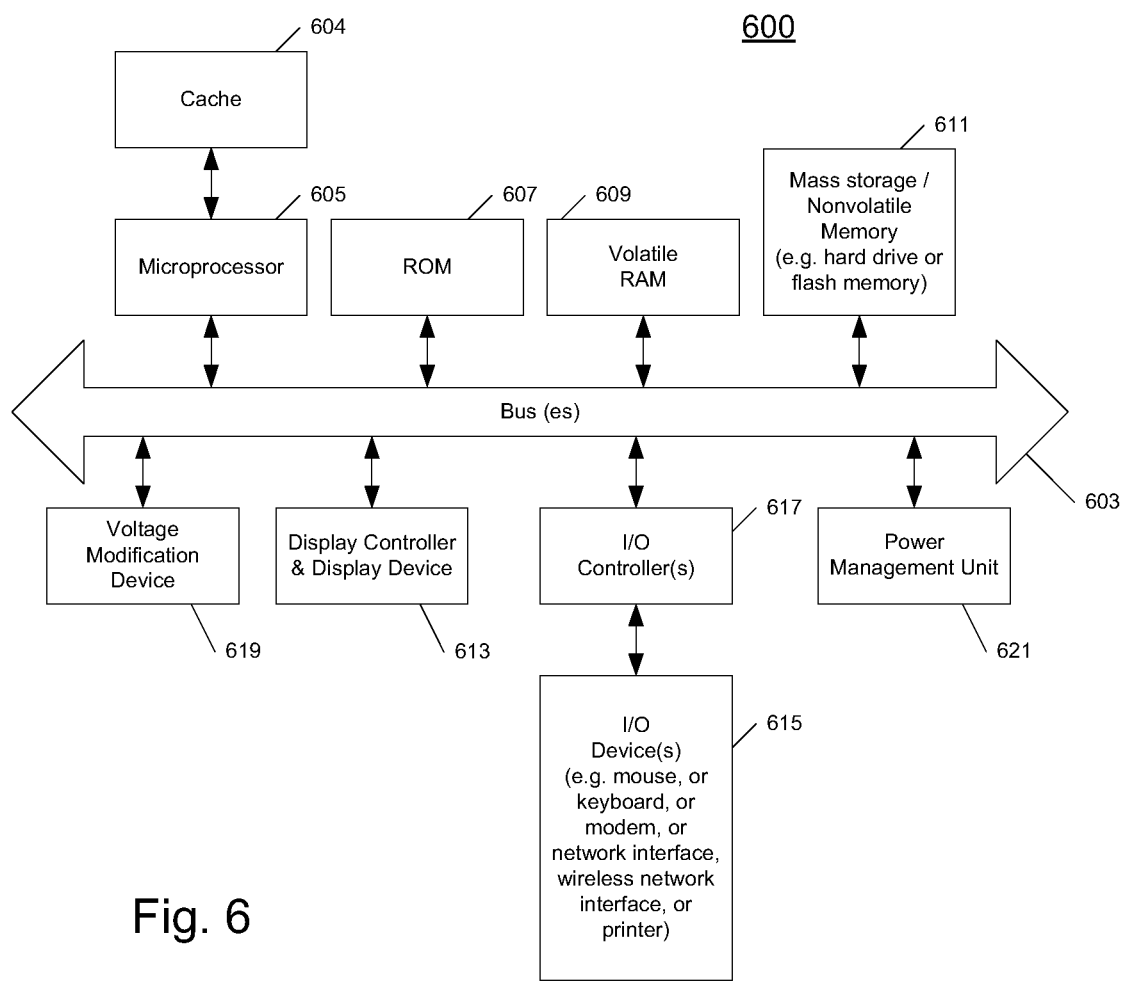
FIG. 6 is a diagram illustrating a data processing system that may be used with an embodiment of the invention.

FIG. 6 shows one example of a data processing system, which may be used with one embodiment the present invention. Note that while FIG. 6 illustrates various components of a computer system, it is not intended to represent any particular architecture or manner of interconnecting the components as such details are not germane to the present invention. It will also be appreciated that network computers, tablet computers, and other data processing systems which have fewer components or perhaps more components may also be used with the present invention.

As shown in FIG. 6, the computer system 600, which is a form of a data processing system, includes a bus 603 which is coupled to a microprocessor(s) 605 and a ROM (Read Only Memory) 607 and volatile RAM 609 and a non-volatile memory 611. The microprocessor 605 is coupled to cache 604. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 613 and to peripheral devices such as input/output (I/O) devices which may be mice, touch screens, touch pads, touch sensitive input devices, keyboards, modems, network interfaces, printers and other devices which are well known in the art. Typically, the input/output devices 615 are coupled to the system through input/output controllers 617. The volatile RAM (Random Access Memory) 609 is typically implemented as dynamic RAM (DRAM) which requires power continually in order to refresh or maintain the data in the memory.

In one embodiment, voltage modification device 619 indicates to power management unit 621 when to raise and lower the voltage according to the dynamic voltage dithering. In other embodiments, voltage modification device 619 and power management unit 621 may be the same device. In still other embodiments, dynamic voltage dithering may be implemented in a hardware device coupled to, or as part of, voltage modification device 619. In another embodiment, the dynamic voltage dithering may be implemented in software and stored in RAM 609, ROM 607, mass storage 611, or other locations. Software-based dynamic voltage dithering may control/change voltages through voltage modification device 619 or through power management unit 621, or another device.

The mass storage 611 is typically a magnetic hard drive or a magnetic optical drive or an optical drive or a DVD RAM or a flash memory or other types of memory systems which maintain data (e.g., large amounts of data) even after power is removed from the system. Typically, the mass storage 611 will also be a random access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 603 may include one or more buses connected to each other through various bridges, controllers and/or adapters as is well known in the art.

Figure 7:
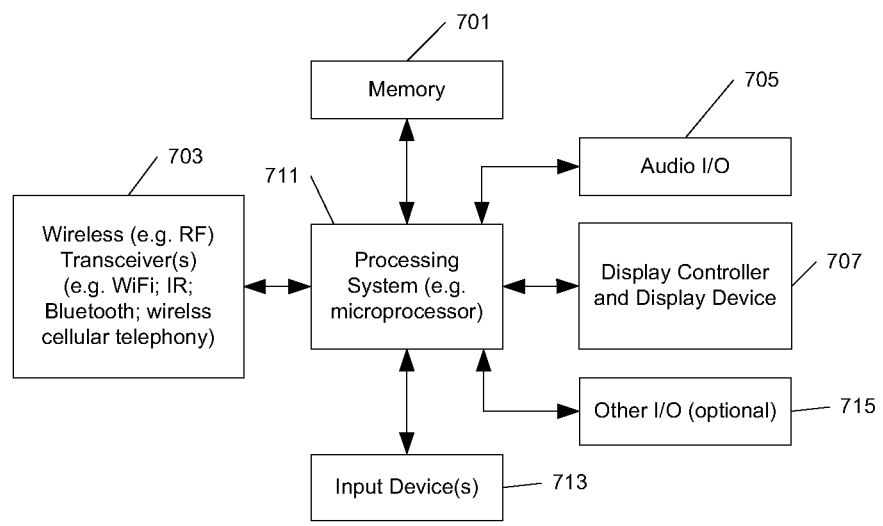
FIG. 7 is a diagram illustrating a device that may be used with an embodiment of the invention.

FIG. 7 shows an example of another data processing system which may be used with one embodiment of the present invention. The data processing system 700 shown in FIG. 7 includes a processing system 711, which may be one or more microprocessors, or which may be a system on a chip integrated circuit, and the system also includes memory 701 for storing data and programs for execution by the processing system. The system 700 also includes an audio input/output subsystem 705 which may include a microphone and a speaker for, for example, playing back music or providing telephone functionality through the speaker and microphone.

In one embodiment, dynamic voltage dithering may be implemented in software and stored in memory 701 for processing by processing system 713, which may control/change voltage using a power management unit (not shown) and/or a voltage modification device (not shown). In other embodiments, dynamic voltage dithering may be implemented in hardware (not shown) and used to control the voltage through the voltage modification device and/or the power management unit. The hardware implementation of dynamic voltage dithering may be included as part of the voltage management device, the power management unit, or another device, including a system on a chip.

A display controller and display device 707 provide a visual user interface for the user; this digital interface may include a graphical user interface which is similar to that shown on a Macintosh computer when running OS X operating system software. The system 700 also includes one or more wireless transceivers 703. A wireless transceiver may be a WiFi transceiver, an infrared transceiver, a Bluetooth transceiver, and/or a wireless cellular telephony transceiver. It will be appreciated that additional components, not shown, may also be part of the system 700 in certain embodiments, and in certain embodiments fewer components than shown in FIG. 7 may also be used in a data processing system.

The data processing system 700 also includes one or more input devices 713 which are provided to allow a user to provide input to the system. These input devices may be a keypad or a keyboard or a touch panel or a multi touch panel. The data processing system 700 also includes an optional input/output device 715 which may be a connector for a dock. It will be appreciated that one or more buses, not shown, may be used to interconnect the various components as is well known in the art. The data processing system shown in FIG. 7 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 700 may be a network computer or an embedded processing device within another device, or other types of data processing systems which have fewer components or perhaps more components than that shown in FIG. 7.

In the foregoing specification, dynamic voltage dithering has been described with reference to exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
receiving, by a data processing system in a low voltage mode, a request for a high voltage mode;
in response to determining that a remaining amount of high voltage credits exceeds a voltage switch threshold value, starting an high voltage timer;
switching to a high voltage mode; and
switching back to the low voltage mode in response to an indication;
wherein the indication includes an indication that the high voltage timer has expired;
starting a low voltage timer in response to switching to the low voltage mode;
determining that the high voltage request is still active in response to receiving an indication that the low voltage timer has expired;
starting another high voltage timer; and
switching to the high voltage mode.

2. The method of claim 1, wherein the request is received from an application running on a data processing system.

3. The method of claim 1, wherein each high voltage credit corresponds to a portion of time within a cycle that can be spent in a high voltage mode and wherein the high voltage timer is configured to expire when the remaining amount of high voltage credits are consumed.

4. The method of claim 1, wherein the voltage switch threshold corresponds to a cost of switching from a low voltage mode to the high voltage mode.

5. The method of claim 4, wherein the data processing system includes one physical timer and wherein expiration of the high voltage timer is determined by a scheduling system.

6. A non-transitory machine readable storage medium storing instructions which when executed by at least one processor cause the at least one processor to perform operations, the operations comprising:
 determining, in response to a request for increased voltage, that a remaining amount of increased voltage credits exceeds a voltage switch threshold value;
 activating an increased voltage mode for at least one component of a data processing system in response to the determination that the remaining amount of increased voltage credits exceeds the voltage switch threshold value;
 wherein activating the increase voltage mode includes:
 starting a increased voltage timer;
 switching to the increased voltage mode; and
 deactivating the increased voltage mode in response to receiving an indication that the increase voltage time has expired;
 starting a decreased voltage mode timer in response to switching to a decreased voltage mode;
 determining that the increased voltage mode is still active in response to receiving an indication that the low voltage timer has expired;
 starting another increased voltage timer; and
 switching to the increased voltage mode.

7. The non-transitory machine readable storage medium of claim 6, wherein the at least one component comprises one or more of a central processing unit (CPU) and graphics processing unit (GPU).

8. The non-transitory machine readable storage medium of claim 6, wherein the request for increased voltage was generated by an application running on the data processing system.

9. A non-transitory machine readable storage medium storing instructions which when executed by at least one processor cause the at least one processor to perform operations, the operations comprising:
 initializing a low voltage time budget and a high voltage time budget;
 switching at least one component of a data processing system into a high voltage mode in response to a first request for high voltage;
 starting a first timer in response to switching to the high voltage mode, wherein the first timer expires when the high voltage time budget is consumed;
 switching to a low voltage mode in response to expiration of the first timer;
 starting a second timer in response to switching to the low voltage mode, wherein the second timer expires when the low voltage time budget is consumed;
 reinitializing the low voltage time budget and the high voltage time budget in response to expiration of the second timer;
 determining, in response to expiration of the second timer, that a second request for high voltage is active;
 switching to the high voltage mode in response to the determining;
 starting a third timer in response to switching to the high voltage mode, wherein the third timer expires when the high voltage time budget is consumed.

10. The non-transitory machine readable storage medium of claim 9, wherein the length of a cycle is equal to the sum of the low voltage time budget and the high voltage time budget.

11. The non-transitory machine readable storage medium of claim 9, wherein the first request for high voltage is the same as the second request for high voltage.

12. A method comprising:
 generating an amount of high voltage credits and an amount of low voltage credits using a factor and a period;
 switching to a high voltage mode in response to a request;
 starting a high voltage timer expiring when the high voltage credits are consumed;
 switching to a low voltage mode in response to an indication that the request has been canceled;
 cancelling the high voltage timer;
 updating the amount of high voltage credits using the duration of the high voltage mode;
 starting a low voltage timer expiring when the low voltage credits are consumed; and
 banking the remaining high voltage credits in response to an indication that the low voltage timer has expired.

13. The method of claim 12, further comprising:
 generating another amount of high voltage credits and low voltage credits based on the period, the factor, the banked high voltage credits, wherein the banked high voltage credits are added to the another amount of high voltage credits.

14. The method of claim 12, wherein remaining high voltage credits beyond a per-cycle threshold value are not banked.

15. The method of claim 13, wherein banked high voltage credits beyond a per-cycle added threshold value are not added to the another amount of high voltage credits.

16. An apparatus comprising:
 means for selecting a high voltage time budget and a low voltage time budget;
 means for switching to a high voltage mode in response to a first request if a remaining portion of the high voltage time budget exceeds a transition threshold value;
 means for switching to a low voltage mode in response to receiving a first event;
 means for switching back to the high voltage mode in response to receiving a second event and a second request.

17. The apparatus of claim 16, wherein selecting a high voltage time budget and a low voltage time budget comprises multiplying a percentage and a cycle period, wherein the high voltage budget is the product and the low voltage budget is cycle period less the high voltage budget.

18. The apparatus of claim 16, wherein the transition threshold value is determined based on an overhead cost of switching to a high voltage mode.

19. The apparatus of claim 16, wherein receiving the first event comprises receiving a callback from a timer set to expire when the high voltage time budget expires.

20. The apparatus of claim 16, wherein receiving the first event comprises receiving an indication that the first request has been canceled.

21. The apparatus of claim 19, wherein receiving the second event comprises receiving a callback from a timer set to expire when the low voltage time budget expires.

* * * * *